US012552598B2

(12) United States Patent
Mondello

(10) Patent No.: US 12,552,598 B2
(45) Date of Patent: Feb. 17, 2026

(54) HOT BEVERAGE BREWING AID

(71) Applicant: Joseph L. Mondello, Shrewsbury, MA (US)

(72) Inventor: Joseph L. Mondello, Shrewsbury, MA (US)

(*) Notice: Subject to any disclaimer, the term of this patent is extended or adjusted under 35 U.S.C. 154(b) by 0 days.

(21) Appl. No.: 19/065,097

(22) Filed: Feb. 27, 2025

(65) Prior Publication Data
US 2025/0270031 A1 Aug. 28, 2025

Related U.S. Application Data

(60) Provisional application No. 63/558,211, filed on Feb. 27, 2024.

(51) Int. Cl.
B65D 85/812 (2006.01)
B65D 85/808 (2006.01)

(52) U.S. Cl.
CPC ....... B65D 85/812 (2013.01); B65D 85/8085 (2013.01)

(58) Field of Classification Search
CPC .............. B65D 85/812; B65D 85/808; B65D 85/8085; B65D 85/8043; B65D 85/8061; B65D 85/816; B65D 1/0246; B65D 17/401; B65D 23/12; B65D 29/00; B65D 3/02; B65D 3/10; B65D 3/28; B65D 33/14; B65D 41/04; B65D 51/24; B65D 61/00; B65D 65/466; B65D 75/20; B65D 75/5805; B65D 77/20; B65D 85/8046; B65D 85/8052; B65B 29/04; B65B 29/028; B65B 29/02; B65B 37/10; B65B 51/00; B65B 51/08; B65B 51/26; B65B 51/303; B65B 9/12; B65B 9/20; B65B 9/2028; B65B 9/213; A47J 31/08; A47J 31/06; A47J 31/002; A47J 31/02; A47J 31/0615; A47J 31/0626; A47J 31/407; A47J 43/284; A47J 31/0631;
(Continued)

(56) References Cited

U.S. PATENT DOCUMENTS 4,735,810 A * 4/1988 Dacal ................... A47G 21/106
100/234
5,091,197 A * 2/1992 Ferro ................... B65D 85/812
206/0.5
11,407,578 B1 * 8/2022 Bouse ................ B65D 81/3876

OTHER PUBLICATIONS

Ding, CN 203127295 U (Year: 2013).*

* cited by examiner

Primary Examiner — Vy T Nguyen
(74) Attorney, Agent, or Firm — Armis IP Law, LLC

(57) ABSTRACT

A beverage brewing device facilitates preparation of homemade tea, coffee, and other brewed or steeped beverages by separating the brewing medium from a hot, brewed beverage prior to consumption. Brewed or steeped beverages typically involve running or immersing a brewing medium with hot water to allow a transfer of oils, flavorings and pigments to the water. The brewing medium is encapsulated in a flexible, permeable steeping pouch containing a brewing substance such as tea leaves to allow the hot water to flow through and transfer the oils and flavorings that define the brewed beverage. The steeping pouch is withdrawn via a tether, and compressed between opposed, insulated panels to squeeze any remaining water into the beverage receptacle. Once substantially all water is extracted, the steeping pouch between the opposed, insulated panels allows discarding of the used steeping pouch without dripping or burning fingers from residual heat.

5 Claims, 4 Drawing Sheets

(58) Field of Classification Search
CPC ............... A47J 31/0636; A47J 31/3623; A47J 31/4403; A47G 19/16; A47G 19/2205; A47G 21/106; A47G 21/04; A23L 27/72; A23L 2/56; A23L 2/60; A23L 2/68; A23L 21/25; A23L 27/82; A23F 3/14; A23F 3/16; A23F 3/18; A23F 5/12; A23F 5/14
USPC ..... 99/287, 295, 323, 323.2; 426/83, 80, 79, 426/394, 77, 78, 81, 110, 115, 466, 595, 426/82, 84, 119, 433, 76; 206/5, 820; 53/134.2, 413, 450, 172, 577; 492/493, 492/226; 100/123, 211, 234; 383/30, 38, 383/75

See application file for complete search history.

HOT BEVERAGE BREWING AID

RELATED APPLICATIONS

This patent application claims the benefit under 35 U.S.C. § 119 (e) of U.S. Provisional Patent App. No. 63/558,211, filed Feb. 27, 2024, entitled "HOT BEVERAGE STRAINER," incorporated herein by reference in entirety.

BACKGROUND

Brewed beverages have been around for many years, and require only the passing of water through a steeping or brewing medium such as a bean, seed, leaf or similar stock for extracting oils and flavorings from the brewing medium into the water. A variety of beverages may be brewed in this manner, requiring only a flavoring/brew medium that can leach or dissolve in water, and a containment for passing the water across the brewing medium. Typically, it is desirable to separate the brewing medium from the brewed beverage prior to consumption, and the water is often heated to facilitate the transfer of the flavorings, oils and other substances from the brewing medium.

SUMMARY

A beverage brewing device facilitates preparation of homemade tea, coffee, and other brewed or steeped beverages by separating the brewing medium from a hot, brewed beverage prior to consumption. Brewed or steeped beverages typically involve running or immersing a brewing medium with hot water to allow a transfer of oils, flavorings and pigments to the water. The brewing medium is encapsulated in a flexible, permeable steeping pouch containing a brewing substance such as tea leaves or coffee beans to allow the hot water to flow through and transfer the oils and flavorings that define the brewed beverage. Upon completion of the brewing process, the steeping pouch is withdrawn via a tether, and compressed between opposed, insulated panels to compress the steeping pouch and squeeze any remaining water into a beverage receptacle. Once substantially all water is extracted, the brewing device including the tether suspending the steeping pouch between the opposed, insulated panels allows discarding of the used steeping pouch without dripping or burning fingers from residual heat.

Configurations herein are based, in part, on the observation that brewed beverages are often made using strainer-type devices such as "tea bags" that soak in hot water to make or brew the beverage. Unfortunately, conventional approaches to brewed beverages suffer from the shortcoming that the saturated bag/strainer is prone to dripping hot liquid and spillage or burns from attempts to extract residual hot water. Conventional approaches include wrapping a string around the bag, compressing the bag between the cup/mug side, and squeezing the bag with spoons or progs, all which tend to be clumsy, prone to spillage, and/or can become lost or difficult to locate. It would be beneficial to develop an integrated brewed beverage straining assist device integrated with a steeping pouch containing the tea, coffee or other brewing substance, that allows insulated manual compression and straining of the residual beverage, allowing easy discard without burning or dripping.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein depict an improved beverage brewing and/or steeping aid for use with a brewing beverage medium, typically packaged in a permeable pouch. A particularly popular brewed beverage is tea, and the permeable pouch is referred to as a "tea bag" for immersion in a beverage container or mug of hot water. The permeable pouch operates as a filter when immersed in the hot water, and is typically suspended from a string stapled or attached a tab, and may form an integrated envelope for packaging.

Brewing tea with a disposable tea filter bag is the easiest and most popular choice worldwide of enjoying a classic cup of tea quickly. Most tea manufacturers package the tea bag in a separate sealed envelope to protect the tea leaves.

Figure 1:
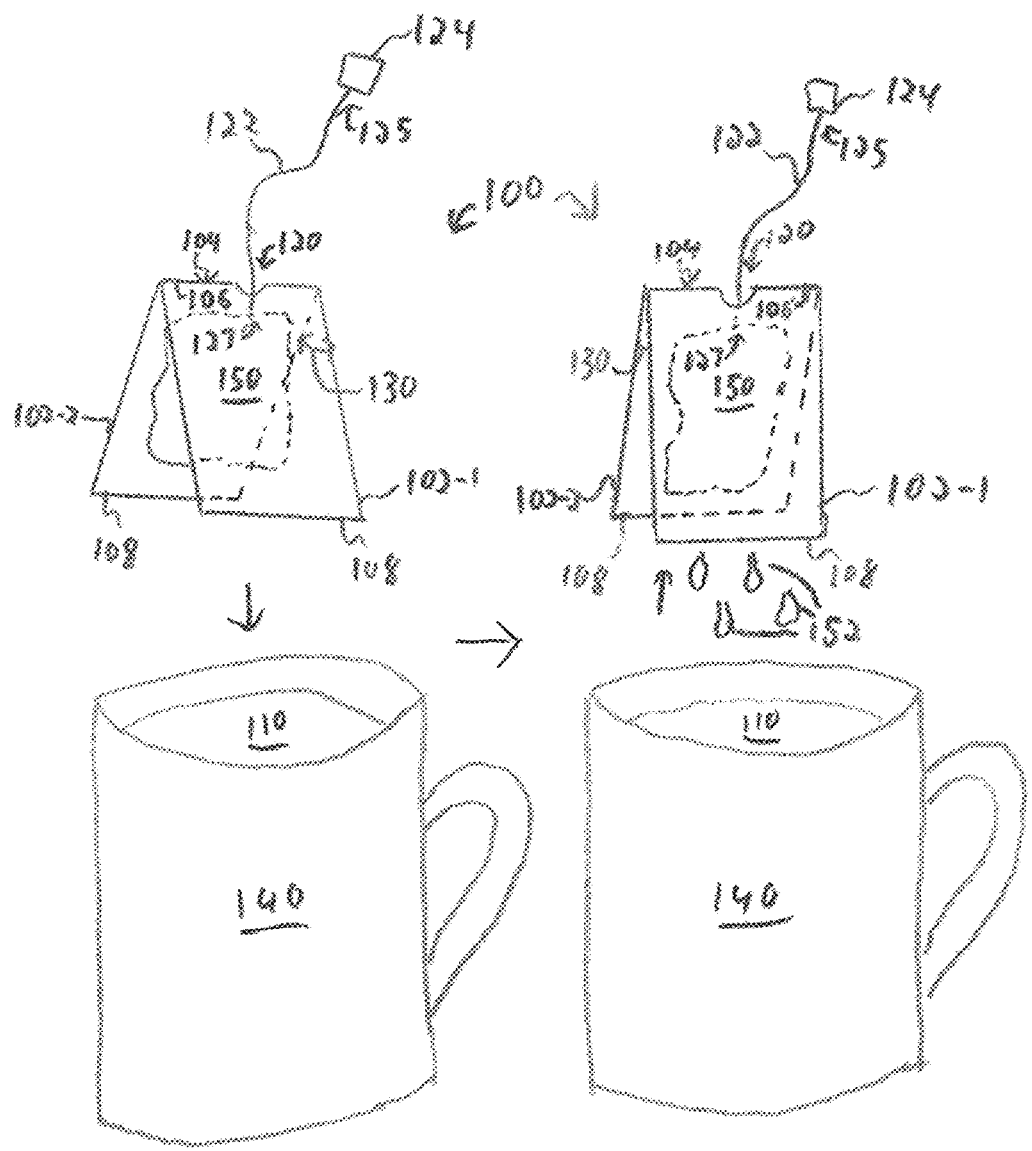
FIG. 1 is a schematic view of the beverage brewing device in use brewing a beverage.
Figure 2A:
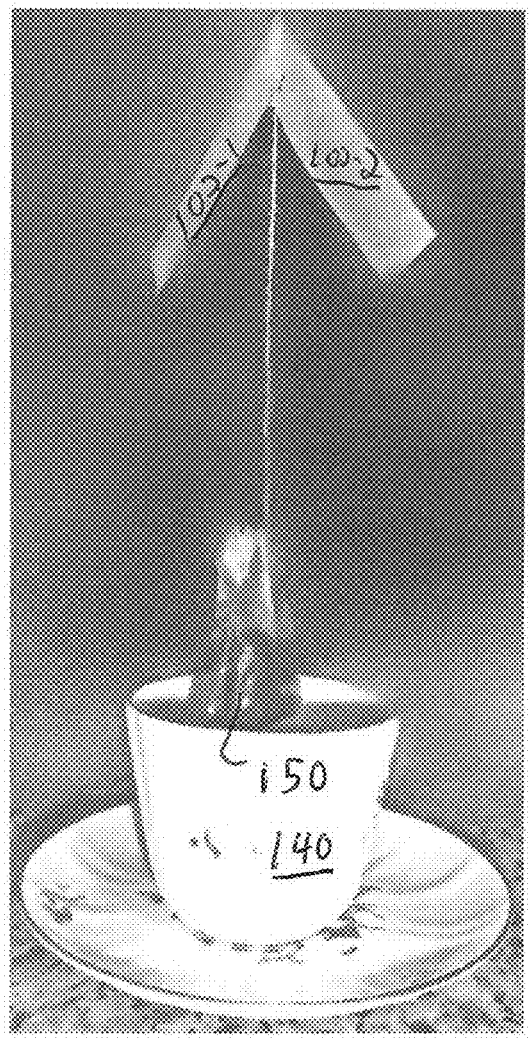
FIGS. 2A-2D show a sequence of use of the beverage brewing device of FIG. 1.
Figure 2B:
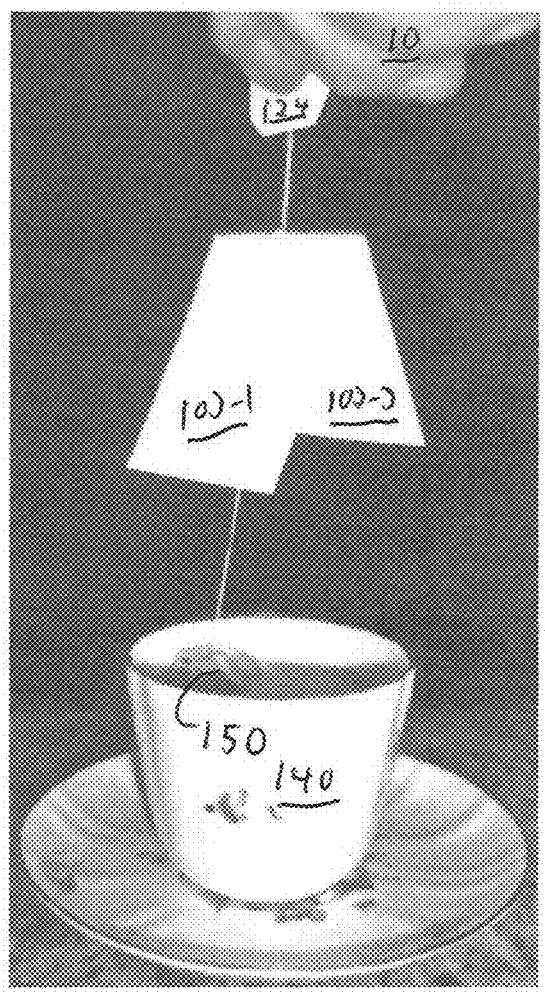
Figure 2C:
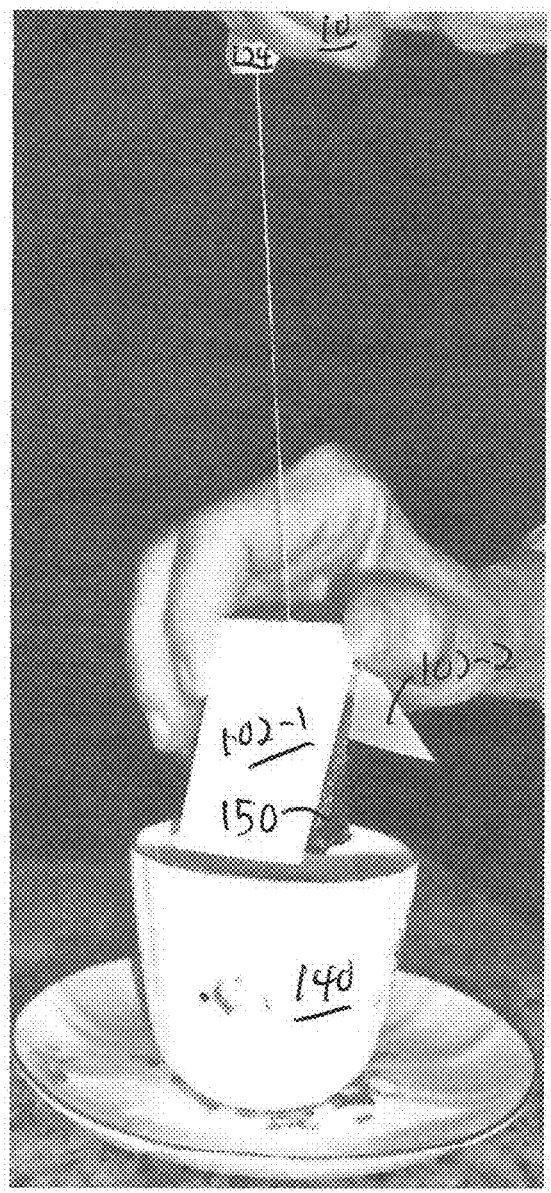
Figure 2D:
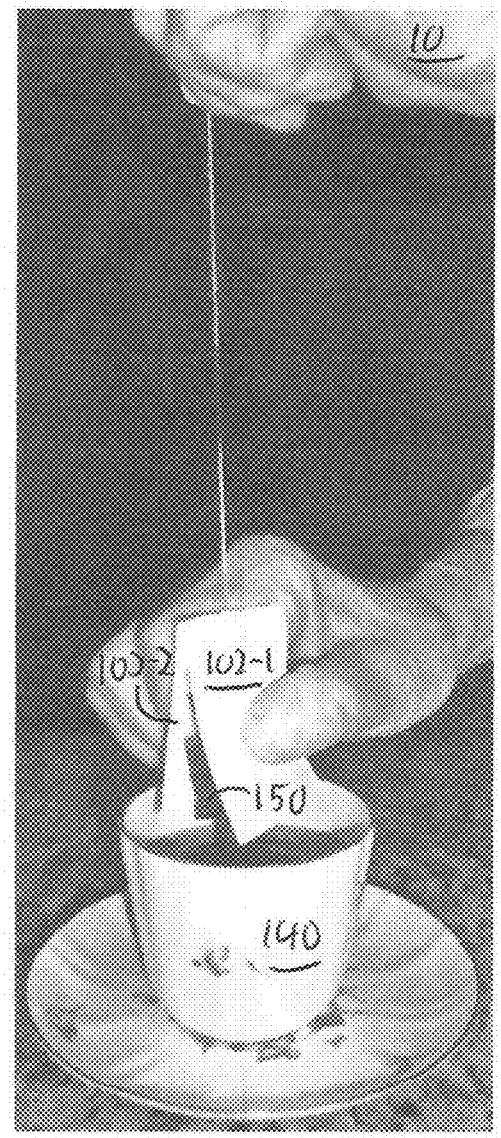

FIG. 1 is a schematic view of the beverage brewing device in use brewing a beverage. Referring to FIG. 1, a beverage brewing assist device 100 as disclosed herein includes a pair of opposed panels 102-1 . . . 102-2 (102 generally) having a thermal resistance based on a temperature of a hot beverage 110. A fold in a cardstock or similar insulated material results in hinge 104 defines an edge common to each opposed panel 102 of the pair of opposed panels. A printed message or advertisement may be applied to the outside of the cardstock prior to folding. An aperture 120 formed in at least one of the opposed panels 102 is adapted to pass a tether 122 defining an interface to a brewing receptacle 140. The hinge 104 is responsive to draw the opposed panels 102 together by reducing an angle 130 defined by the hinge 104.

In the example configuration, each of the opposed panels 102 has a proximate side 106 engaged with the proximate side 106 of the other of the opposed panels 102 via the hinge 104, and a distal side 108, such that each distal side 108 is drawn towards the distal side of the opposed panel by pivoting of the hinge 104. Each of the opposed panels 102 has a size based on a size of a steeping pouch 150, where the steeping pouch has a liquid permeable, flexible exterior surface enclosing a brewing substance. The panels 102 are sufficiently large in area to enclose the steeping pouch 150 when compressed. Generally, the brewing substance, such as coffee or tea, is responsive to hot water for extraction of flavorings for the brewed beverage, as the steeping pouch 150 is immersed in the receptacle 140 containing hot water to generate the brewed beverage after steeping.

The tether is initially outside the opposed panels as the steeping pouch is stored therebetween. Upon removal, the opposed panels slide upwards along the tether towards the tab to allow the oppose panels to remain suspended outside the mug or brewing container during steeping. A user extends the steeping pouch via the tether distally from the opposed panels 102 as the tether 122 is drawn through the aperture 120. A tab or stopper 124 limits tether travel, and suspends the opposed panels along the side of the receptacle 140 during brewing/steeping. As with the opposed panels, a message or promotion may be printed on either or both sides of the tab. Upon completion, the tether 122 is drawn through the aperture 104 to dispose the steeping pouch above and out of the freshly brewed beverage 110, and engages the saturated steeping pouch 150 between the opposed panels 102. A user or tool folds the opposed panels via the hinge to close the angle 130 and compress the saturated steeping pouch 150 as residual liquid 152 drips out. Insulative properties of the opposed panels 102 prevent thermal transfer or burning of fingers through the panels 102 from manual squeezing. The compressed steeping pouch 150 and opposed panels 102 may then be discarded and the beverage 110 enjoyed.

A stock of steeping pouches may be packaged and sold using a method for packaging a plurality of the steeping pouches by attaching a respective tether to each of a plurality of steeping poches 150, and passing the tether 122 through the aperture 120 of a respective corresponding pair of opposed sides 102 and hinge 104. A plurality of steeping pouches may then be arranged in a row or stacked sequence, such that each opposed panel in the sequence is substantially parallel to an opposed panel 102 or side of an adjacent steeping pouch 150, thereby forming an ordered row. For each of the plurality of steeping pouches, the pair of opposed panels 102 may be formed by folding a planar material of cardstock, plastic, or other thermally resistant material in a substantially bifurcating manner to form the hinge, and aligning the sequence in a channel of an outer packaging or box. The aperture 104 may be formed prior to or after folding; similarly, a promotional message may be printed on the outside of the planer material before folding. The tether 122 is attached to the steeping pouch at a distal end 127 and adapted for manual grasping via the tab 124 at a proximal end 125.

The steeping pouch 150 may be formed from any suitable flexible, porous material adapted to pass a brewing liquid and responsive to compression for brewing liquid/water displacement. In an example configuration, the brewing substance is coffee or tea, however any suitable granular, ground or other material suitable for containment in the pouch may be employed. The opposed panels 102, when folded to encapsulate the steeping pouch, may have a protective and sealing effect to avoid crushing or agitating the contents, such as tea leaves. The opposed panels 102 may be joined or attached by a temporary adhesion or perforation, effectively replacing the conventional envelope around the steeping pouch. Particularly when arranged in a stacked or adjacent arrangement in a packaging box, depicted below in with respect to FIG. 3, the snug arrangement protect the brewing substance from staleness or agitation. A reusable, sealable box may be employed with the stacked steeping pouches for enhancing freshness and avoiding excessive packaging waste.

FIGS. 2A-2D show a sequence of use of the beverage brewing device of FIG. 1 using a tea bag as a beverage pouch 150 and a folded cardstock member as the opposed sides 102 of the device 100. Referring to FIGS. 1 and 2A-2D, to use the new package integrated with the steeping pouch 150 such as a tea bag, the user 10 places the tea bag in the cup with the opposed panels 102 defined by folded card stock hanging over the edge of the cup. The user pours the heated (or cold) water into the cup according to the instructions and steeps/brews the beverage. When steeping time is completed, the user picks up the small tag with one hand and lift the tea bag straight up out of the cup. Subsequently, the the folded card portions are drawn over the tea bag with the other hand to completely encase the tea bag which can be squeezed or compressed to release the beneficial tannins known to have health benefits helping prevent disease. More generally, the compressed steeping pouch 150' releases absorbed liquid which tends to contain a high concentration of the brewed substances, while the insulative properties of the opposed panels 102 alleviates discomfort from the hot liquid released. According to reports, tea tannins are antioxidants, they fight inflammation, have antibacterial effects, may protect against heart disease, and help balance blood sugar levels. Aside from that, if you simply desire a stronger cup of tea, just squeeze the fold; no burnt fingers, no broken bags. and no mess of a dripping tea bag aside your cup. Many prefer their tea as the English do, with a spot of cold milk.

Figure 3:
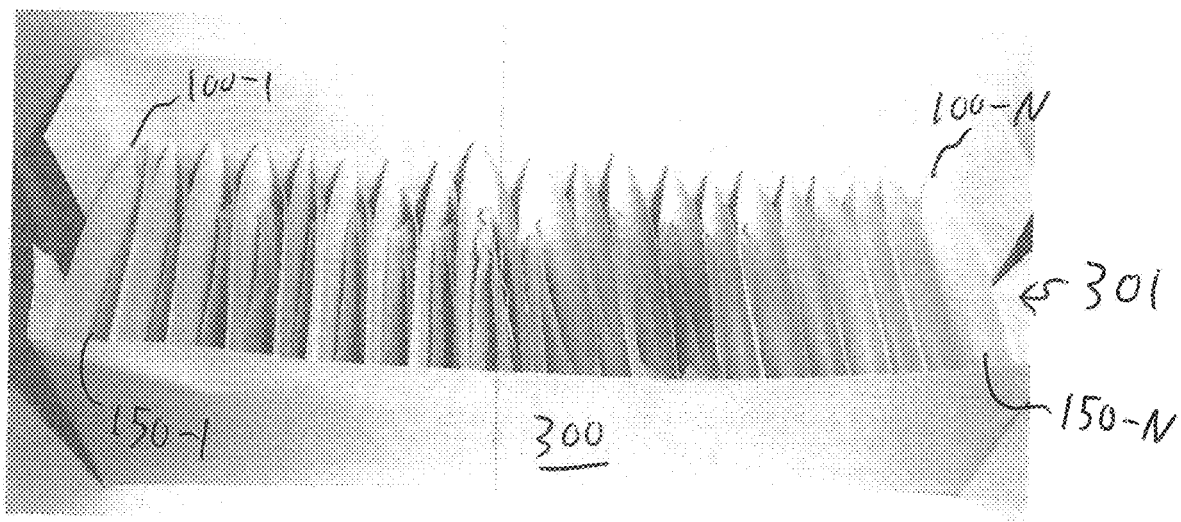
FIG. 3 shows an example of packaging a plurality of the beverage brewing device in conjunction with a brewing pouch.

FIG. 3 shows an example of packaging a plurality of the beverage brewing device in conjunction with the steeping pouch 150. The device 100 may replace conventional packaging by encapsulating the steeping pouch 150 with the opposed panels 102. A plurality of steeping pouches 150-1 . . . 150-N (150 generally) may be arranged in a row 301 encapsulated by the devices 100-1 . . . 100-N (100 generally) within a point of sale container package 300.

With the use of the new packaging assembly, the expense of a conventional envelope can be eliminated with the replacement of less expensive card stock which can also carry the directions and advertising of the manufacturer. The card stock is folded and used to protect the tea bag in the point-of-sale container package.

Although configurations herein depict this packaging primarily for tea, it may also be used for other beverages and herbs, spices, seasonings, requiring steeping. Also depicted is a photo (attached) of a sample package of twenty tea bags ready for use. The tea leaves are protected by the card stock and the individually packaged tea bags are ready to be steeped.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A beverage brewing assist device, comprising:
   a pair of opposed panels, the opposed panels formed from a cardstock and having a thermal resistance based on a temperature of a hot beverage and a compression of a steeping pouch for removing residual liquid;
   a hinge defining an edge common to each opposed panel of the pair of opposed panels, the opposed panels formed from the cardstock configured to receive a printed message; and
   an aperture formed in at least one of the opposed panels, the aperture adapted to pass a tether defining an interface to a brewing receptacle,
   the hinge responsive to draw the opposed panels together by reducing an angle defined by the hinge; and
   each of the opposed panels having a size based on a size of the steeping pouch, the steeping pouch having a liquid permeable, flexible exterior surface enclosing a brewing substance, the opposed panels adapted for engaging in a parallel adjacency with other opposed panels for forming an ordered row in a point of sale package.

2. The device of claim 1 wherein each of the opposed panels has:
   a proximate side, the proximate side engaged with the proximate side of the other of the opposed panels via the hinge; and a distal side, each distal side drawn towards the distal side of the opposed panel by pivoting of the hinge.

3. The device of claim 1 wherein the brewing substance is responsive to water for extraction of flavorings for the brewed beverage.

4. The device of claim 1 wherein the opposed panels are larger than the steeping pouch and form an attachment around a perimeter of the opposed panels for enclosing the steeping pouch between the opposed panels.

5. The device of claim 4 further comprising an adhesive or perforated engagement between the opposed panels.

* * * * *